(12) United States Patent
Da Silva et al.

(10) Patent No.: US 10,683,847 B2
(45) Date of Patent: Jun. 16, 2020

(54) SELF-SUPPORTING SUPPORT STRUCTURE FOR WIND TURBINE EQUIPMENT

(71) Applicant: GeoSea N.V., Zwijindrecht (BE)

(72) Inventors: Alexandra Sofia Gonçales Da Silva, Antwerp (BE); Dieter Wim Rabaut, Ghent (BE); Wouter Haring, IJsselstein (NL)

(73) Assignee: DEME Offshore BE NV, Zwijndrecht (BE)

( * ) Notice: Subject to any disclaimer, the term of this patent is extended or adjusted under 35 U.S.C. 154(b) by 0 days.

(21) Appl. No.: 16/055,381

(22) Filed: Aug. 6, 2018

(65) Prior Publication Data
US 2019/0040844 A1 Feb. 7, 2019

(30) Foreign Application Priority Data

Aug. 4, 2017 (BE) .................................... 20175543

(51) Int. Cl.
*F03D 13/20* (2016.01)
*F03D 80/80* (2016.01)
(Continued)

(52) U.S. Cl.
CPC .............. *F03D 13/22* (2016.05); *F03D 1/065* (2013.01); *F03D 13/10* (2016.05); *F03D 13/20* (2016.05);
(Continued)

(58) Field of Classification Search
CPC ....... E04H 12/085; E04H 12/342; E04G 3/20; E04G 3/30; E04G 3/243
See application file for complete search history.

(56) References Cited

U.S. PATENT DOCUMENTS 7,805,893 B2 * 10/2010 Scholte-Wassink .... F03D 80/82
52/40
8,839,586 B2 * 9/2014 Edenfeld ................. E04H 12/34
52/651.07
(Continued)

FOREIGN PATENT DOCUMENTS

EP 1788242 A1 * 5/2007 ........... E04H 12/085
EP 2746577 A1 * 6/2014 ............. F03D 80/82
(Continued)

OTHER PUBLICATIONS

Search Report and Written Opinion for EPO Application No. 18185854.9 (10 pages). (Year: 2018).*

*Primary Examiner* — Rodney Mintz
(74) *Attorney, Agent, or Firm* — The Webb Law Firm

(57) ABSTRACT

Described is a self-supporting support structure for wind turbine equipment. The support structure can be accommodated in a hollow transition piece for connecting a tower of an offshore wind turbine to a foundation pile, or in a foundation pile itself. The support structure includes two or more floors placed vertically above each other and supported by upright supports. At least one floor connects substantially fittingly to an internal peripheral wall of the transition piece or the foundation pile, and said floor is provided with means for reducing its surface area, for instance foldable edge parts. Also described is a method for assembling at least a part of an offshore wind turbine, wherein the self-supporting support structure is applied.

17 Claims, 12 Drawing Sheets

(51) Int. Cl.
*F03D 13/10* (2016.01)
*F03D 13/25* (2016.01)
*F03D 1/06* (2006.01)
*E04H 12/08* (2006.01)

(52) U.S. Cl.
CPC ............ *F03D 13/25* (2016.05); *F03D 80/80* (2016.05); *E04H 12/085* (2013.01); *F05B 2230/60* (2013.01); *F05B 2240/912* (2013.01); *F05B 2240/95* (2013.01); *Y02E 10/728* (2013.01)

(56) References Cited

U.S. PATENT DOCUMENTS

| | | | | |
|---|---|---|---|---|
| 9,057,205 | B2* | 6/2015 | Reed | E04H 12/08 |
| 9,487,960 | B2* | 11/2016 | Kent | E04G 3/20 |
| 2007/0296220 | A1* | 12/2007 | Kristensen | F03D 13/10 |
| | | | | 290/55 |
| 2009/0223139 | A1* | 9/2009 | Meiners | F03D 80/80 |
| | | | | 52/40 |
| 2010/0139180 | A1* | 6/2010 | Meiners | F03D 13/10 |
| | | | | 52/111 |
| 2012/0066998 | A1* | 3/2012 | Tobinaga | F03D 9/25 |
| | | | | 52/651.01 |
| 2012/0168116 | A1* | 7/2012 | Mello | F03D 13/25 |
| | | | | 165/47 |
| 2013/0174508 | A1* | 7/2013 | Reed | E04H 12/08 |
| | | | | 52/655.1 |
| 2015/0198148 | A1* | 7/2015 | Mello | F03D 13/25 |
| | | | | 416/244 R |
| 2015/0361679 | A1* | 12/2015 | Kent | E04G 3/20 |
| | | | | 52/40 |
| 2019/0301196 | A1* | 10/2019 | Reed | E04H 12/342 |

FOREIGN PATENT DOCUMENTS

| | | | | |
|---|---|---|---|---|
| EP | 2784310 A1 * | 10/2014 | ............ | E04B 1/40 |
| WO | WO-2014070084 A2 * | 5/2014 | ............ | F03D 80/00 |
| WO | WO-2015078476 A1 * | 6/2015 | ............ | F03D 80/82 |

* cited by examiner

SELF-SUPPORTING SUPPORT STRUCTURE FOR WIND TURBINE EQUIPMENT

CROSS-REFERENCE TO RELATED APPLICATION

This application claims priority to Belgian Patent Application No. 20175543 filed Aug. 4, 2017, the disclosure of which is hereby incorporated in its entirety by reference.

TECHNICAL FIELD OF THE INVENTION

The invention relates to a self-supporting support structure for wind turbine equipment, wherein the support structure can be accommodated in a hollow peripheral body comprising a transition piece for connecting a tower of an offshore wind turbine to a foundation pile, or a foundation pile itself. The invention also relates to a peripheral body provided with the support structure, and particularly a transition piece, provided with the support structure, for connecting a tower of an offshore wind turbine to a foundation pile. The invention likewise relates to a method for assembling at least a part of an offshore wind turbine while making use of the self-supporting support structure.

BACKGROUND OF THE INVENTION

An offshore wind turbine is generally placed on a support structure anchored to a seabed. For offshore wind turbines which are placed in relatively shallow water the support structure can comprise a foundation pile arranged in the seabed, also referred to as monopile. A lattice structure or jacket can, if desired, be applied for deeper water. Reference will be made hereinbelow to a foundation pile, although this can also be understood to mean a jacket. In order to connect the wind turbine tower to a monopile use is in the prior art made of a transition piece. The transition piece is connected on a lower side thereof to the monopile and on an upper side thereof to the wind turbine tower. The transition piece can, if desired, be provided with add-on constructions such as a work platform, a jetty and other useful applications.

A gondola or nacelle is then placed on top of the wind turbine tower, and a hub mounted on the nacelle is provided with rotor blades. The equipment required for the operation of the wind turbine is generally placed in the nacelle or in the tower. This equipment comprises inter alia electrical equipment, such as transformers, switchgear, converters and the like.

In a known method this equipment is hoisted from for instance a jack-up platform or other vessel into an already placed transition piece or foundation pile using a lifting means. This method is however time-consuming and susceptible to the equipment becoming damaged, especially when work has to be carried out in relatively severe weather.

SUMMARY OF THE INVENTION

An object of the present invention is to provide a method and device with which wind turbine equipment can be arranged in a wind turbine, particularly an offshore wind turbine, in a safe and efficient manner.

This object is achieved by providing a device which comprises a self-supporting support structure for wind turbine equipment, wherein the support structure can be accommodated in a hollow peripheral body comprising a transition piece for connecting a tower of an offshore wind turbine to a foundation pile, or comprising a foundation pile itself, wherein the support structure comprises two or more floors placed vertically above each other and supported by one or more upright supports, at least one floor connects substantially fittingly to an internal peripheral wall of the peripheral body, and said floor is provided with means for reducing its surface area.

The self-supporting support structure can be constructed and provided with the desired wind turbine equipment almost entirely in a safe environment, for instance an onshore location. The support structure forms a protection for the wind turbine equipment during offshore placing. The support structure further allows a standardization. The dimensions of the floors, particularly their surface area, can indeed be adjusted to the internal dimensions common in the industry of the peripheral body in which the support structure can be accommodated, without the principle of the support structure having to be altered. When a transition piece is applied, such a piece is connected on an underside thereof to a foundation pile arranged in the underwater bottom. On an upper side of the transition piece a mounting means (flange) is provided for connection to the wind turbine tower. The number of floors of the support structure which are mutually connected by means of the upright supports can be chosen subject to the distance between the connection to the tower and the connection to the foundation pile which is required for a determined wind turbine.

A further advantage of the support structure is that the wind turbine equipment can be placed in the wind turbine with a single operation. This is possible by arranging the support structure provided with wind turbine equipment in a hollow peripheral body, for instance a transition piece, and then placing the peripheral body provided with the support structure on the foundation pile using a lifting means. Another option comprises of taking up a support structure provided with wind turbine equipment and arranging it in a peripheral body using a lifting means, wherein the peripheral body comprises a transition piece arranged on a foundation pile for connecting a tower of an offshore wind turbine to the foundation pile, or a foundation pile itself.

It is advantageous for the support structure to be provided with the wind turbine equipment and to then be arranged in the transition piece in an embodiment of the method. The manufacture of the wind turbine equipment, which for instance comprises of forming electrical connections, and the manufacture of a transition piece can in this way be performed separately, optionally even at different locations. This reduces the chance of damage.

The invention thus also provides a method for assembling an offshore wind turbine in which a self-supporting support structure according to the invention is arranged in an internal cavity of a peripheral body. In an embodiment of the method the peripheral body forms a transition piece for connecting a tower of an offshore wind turbine to a foundation pile, and the transition piece provided with the support structure is placed on the foundation pile using lifting means and is connected thereto, for instance by bolting or by a grouted connection.

According to the invention, at least one floor connects substantially fittingly to an internal peripheral wall of the peripheral body in which the support structure can be accommodated or is accommodated. In the context of this invention connecting fittingly is understood to mean that the distance from an outer edge of the relevant floor to the internal peripheral wall of the peripheral body amounts to no more than 20 cm (7.9 in), preferably no more than 10 cm.

To enable the support structure to be placed in any peripheral body and to simultaneously realize the fitting connection said floor is provided with means for (temporarily) reducing its surface area.

In a suitable embodiment of the support structure the means for reducing the surface area comprise foldable edge parts of the floor. This measure also enhances the standardization.

In a preferred embodiment at least two and still more preferably all floors of the support structure connect substantially fittingly to the internal peripheral wall of the peripheral body.

The support structure according to the invention is self-supporting. This is understood to mean that the support structure is strong and stiff enough to be taken up by a lifting means, and is preferably strong and stiff enough to be taken up by a lifting means when it is provided with wind turbine equipment.

The number of floors in the support structure can in principle be chosen freely, wherein the above stated distance between the connections to the tower and the foundation pile can play a part. A suitable embodiment according to the invention provides a support structure comprising three or more floors placed vertically above each other and supported by the upright support(s), more preferably three floors. Such a support structure is able to accommodate the wind turbine equipment required for a good operation of the wind turbine, without the support structure becoming unnecessarily heavy. In an embodiment with three or more floors the electrical equipment, for instance also including the switchgear, can if desired be situated wholly in the support structure, which prevents such equipment also having to be accommodated partially in the foundation pile and/or wind turbine tower.

According to another embodiment of the invention, an upper floor of the support structure is configured to couple a wind turbine tower to an upper side of the peripheral body. This is understood to mean that the upper floor comprises the provisions necessary for said connection. In the present application this floor is also referred to as coupling floor.

In yet another embodiment a floor of the support structure comprises electrical switchgear, and this switching floor is situated a height of at least 2.5 m (8.2 ft) below the upper floor, more preferably a height of 2.5-5 m (8.1-16.4 ft) below the upper floor, and most preferably a height of 2.5-3.5 m (8.1-11.5 ft) below the upper floor. In yet another embodiment a floor of the support structure comprises guide means for electrical cables.

In a particularly useful embodiment of the invention a lower floor of the support structure is provided along a peripheral edge with sealing means configured to realize a substantially airtight seal with the internal peripheral wall of the peripheral body. The substantially airtight seal ensures that, after placing of the support structure provided with wind turbine equipment in a wind turbine tower, the portion above the lower floor is sealed off substantially airtightly from the spaces lying below the lower floor, which are generally relatively damp. The seal contributes to the durability of the offshore wind turbine, and corrosion is in particular delayed. In the present application this floor is also referred to as airtight floor.

The sealing means can take any desired form, but an embodiment of the support structure wherein the sealing means comprise a rubber profile has advantages.

In an embodiment in which the support structure comprises two floors the upper floor functions as coupling floor, and the lower floor preferably has the combined function of switching floor and airtight floor. In an embodiment with two floors a part of the electrical equipment, for instance the switchgear, can if desired be situated in the foundation pile and/or wind turbine tower.

In order to increase the accessibility between the floors, in an embodiment of the support structure the floors are mutually connected by one or more upright ladders.

Another embodiment which is useful in this context comprises a support structure wherein at least one floor is provided with a hatch which provides access to an underlying floor.

The geometry of the support structure and of the floors can be chosen within limits wherein standardization, usual dimensions of offshore wind turbine foundations and simplicity, speed and safety of placing are important. A favourable embodiment comprises a support structure wherein at least one floor is circular or polygonal, and the upright supports are arranged in accordance with the corner points of a polygon in the peripheral direction of the at least one floor. At least two floors, and still more preferably all floors of the support structure, are preferably circular or polygonal. By arranging the upright supports in accordance with this embodiment a relatively light and sufficiently strong support structure is obtained. The open spaces between the upright supports further ensure that the support structure is relatively unsusceptible to wind forces, which facilitates the placing.

As already stated above, the support structure is suitable to be accommodated in a peripheral body. The invention therefore relates to a hollow peripheral body, a cavity of which is provided with a support structure according to one of the embodiments described in the present application. The hollow peripheral body preferably comprises a transition piece for connecting a tower of an offshore wind turbine to a foundation pile, or a foundation pile itself, particularly an upper portion of such a foundation pile. Such an upper portion of a foundation pile preferably extends from an upper edge of the foundation piles over a distance of a maximum of 50% of the overall length of the foundation pile, more preferably a maximum of 40%, still more preferably a maximum of 30%, and most preferably a maximum of 20%.

In an embodiment of the peripheral body an internal cavity of the peripheral body is provided with the self-supporting support structure, and the peripheral body comprises on an upper side thereof a mounting means (flange) for a wind turbine tower.

In yet another embodiment an upper floor of the support structure of the peripheral body is configured to couple a wind turbine tower to an upper side of the peripheral body, and this coupling floor is situated a height of 0.5-2.5 m (1.7-8.2 ft) below the mounting means, more preferably a height of 0.8-2.5 m (2.6-8.2 ft), still more preferably a height of 1.2-2.5 m (3.9-8.2 ft), still more preferably a height of 1.2-2.0 m (3.9-6.6 ft), and most preferably a height of 1.2-1.5 m (3.9-4.9 ft) below the mounting means.

According to yet another embodiment, the peripheral body is characterized in that at least one floor supports on a stop provided on the wall of the internal cavity.

A particularly useful embodiment of the peripheral body comprises a transition piece for connecting a tower of an offshore wind turbine to a foundation pile, wherein the transition piece comprises an internal hollow peripheral body which can be connected on an underside to the foundation pile and is provided on an upper side with a mounting means (flange) for the tower, wherein an internal cavity of the transition piece is provided with a self-supporting support structure according to the invention.

An embodiment of the transition piece for connecting a tower of an offshore wind turbine to a foundation pile comprises an internal hollow peripheral body which can be connected on an underside to the foundation pile and is provided on an upper side with a mounting means for the tower, preferably in the form of a flange, wherein an internal cavity of the transition piece is provided with a self-supporting support structure according to the invention. Once the transition piece has been placed on a foundation of a wind turbine, a tower of the wind turbine is placed on the transition piece using a lifting means, wherein the mounting means is coupled to a corresponding mounting means provided on an underside of the tower. Suitable mounting means comprise two peripheral flanges which are provided with holes distributed over the periphery and which are placed against each other, wherein corresponding holes are placed opposite each other. The connection can then be realized by placing bolts through the holes and fastening them with nuts.

A practical embodiment of the transition piece is characterized in that an upper floor of the support structure arranged in the transition piece is configured to couple a wind turbine tower to an upper side of the peripheral body, and this coupling floor is situated a height of 0.5-2.5 m (1.6-8.2 ft) below the mounting means, more preferably a height of 0.8-2.5 m (2.6-8.2 ft), still more preferably a height of 1.2-2.5 m (3.9-8.2 ft), still more preferably a height of 1.2-2.0 m (3.9-6.6 ft), and most preferably a height of 1.2-1.5 m (3.9-4.9 ft) below the mounting means.

The support structure can be connected to the peripheral part, particularly to the transition piece, in any manner. In an embodiment of the invention a transition piece is provided wherein at least one floor supports on a stop provided on the wall of the internal cavity of the transition piece.

Another embodiment which enhances the durability of the installed wind turbine relates to a transition piece wherein a lower floor is provided along a peripheral edge with sealing means configured to realize a substantially airtight seal with the internal peripheral wall of a foundation pile. A further improvement is achieved in an embodiment wherein the lower airtight floor is situated at a distance to (or height below) the mounting means such that, after coupling of the transition piece to the foundation pile, this airtight floor connects to a stop provided on the internal wall of the foundation pile. Not only is the support structure in this way durably connected to the foundation pile, the airtightness is also improved. A suitable embodiment comprises a rubber sealing ring which is held tightly between a lower edge of the lower floor and the stop of the foundation pile or transition piece.

Finally, it is stated that the embodiments of the invention described in this patent application can be combined in any possible combination of these embodiments, and that each embodiment can individually form the subject-matter of a divisional patent application.

BRIEF DESCRIPTION OF THE DRAWINGS

The invention will now be further elucidated with reference to the following figures and description of a preferred embodiment, without the invention otherwise being limited thereto. In the figures.

DESCRIPTION OF THE INVENTION

Figure 1:
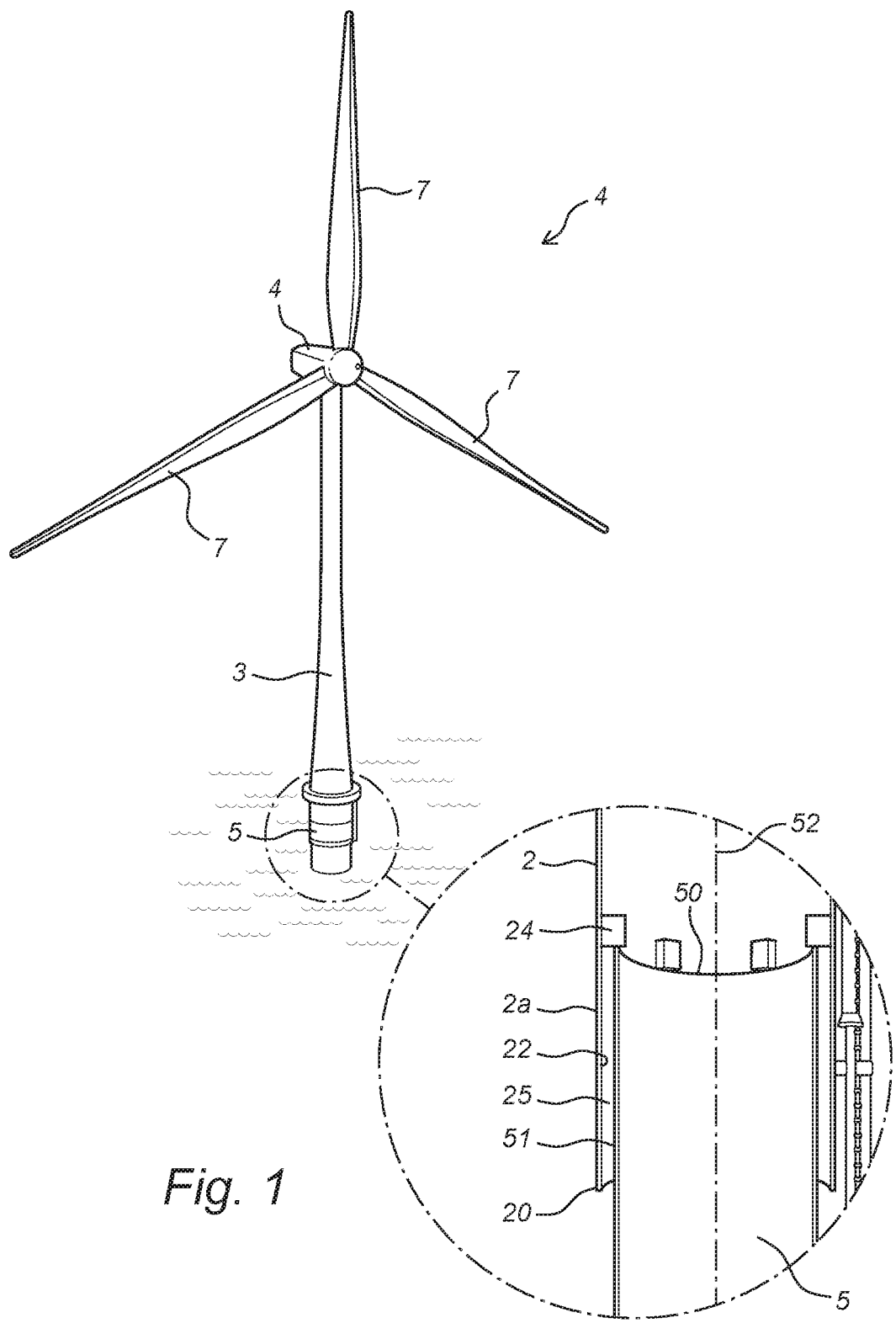
FIG. 1 is a schematic perspective view of an offshore wind turbine on a monopile foundation, with a detail of a transition piece.

\Shown with reference to FIG. 1 is an offshore wind turbine 4. Turbine 4 comprises a turbine tower 3 provided on an upper side with a gondola and a number of rotor blades 7. Wind turbine 4 is placed on a foundation anchored to a seabed. In the shown embodiment the foundation has the form of a monopile 5. Monopile 5 forms a tubular element and can extend in a vertical longitudinal direction 52 from the seabed to a position above the water surface, but can also be situated with an upper edge 50 under water. To connect wind turbine tower 3 to a monopile 5 use can be made of a transition piece 2. Transition piece 2 likewise forms a tubular element and extends from a lower edge 20 to an upper edge 21. According to the detail drawing of FIG. 1, transition piece 2 can be provided with a skirt part 2a which is placed over a top part of monopile 5, wherein an intermediate space 25 is created between an inner surface 22 of skirt part 2a of transition piece 2 and an outer surface 51 of monopile 5. The height of intermediate space 25 can if desired be determined by providing an inner surface of transition piece 2 with protrusions 24 which find support on upper edge 50 of monopile 5. Space 25 can then be filled with a curing substance such as grouting mortar or grout. After curing, a connection is in this way obtained between transition piece 2 and monopile 5.

Figure 2A:
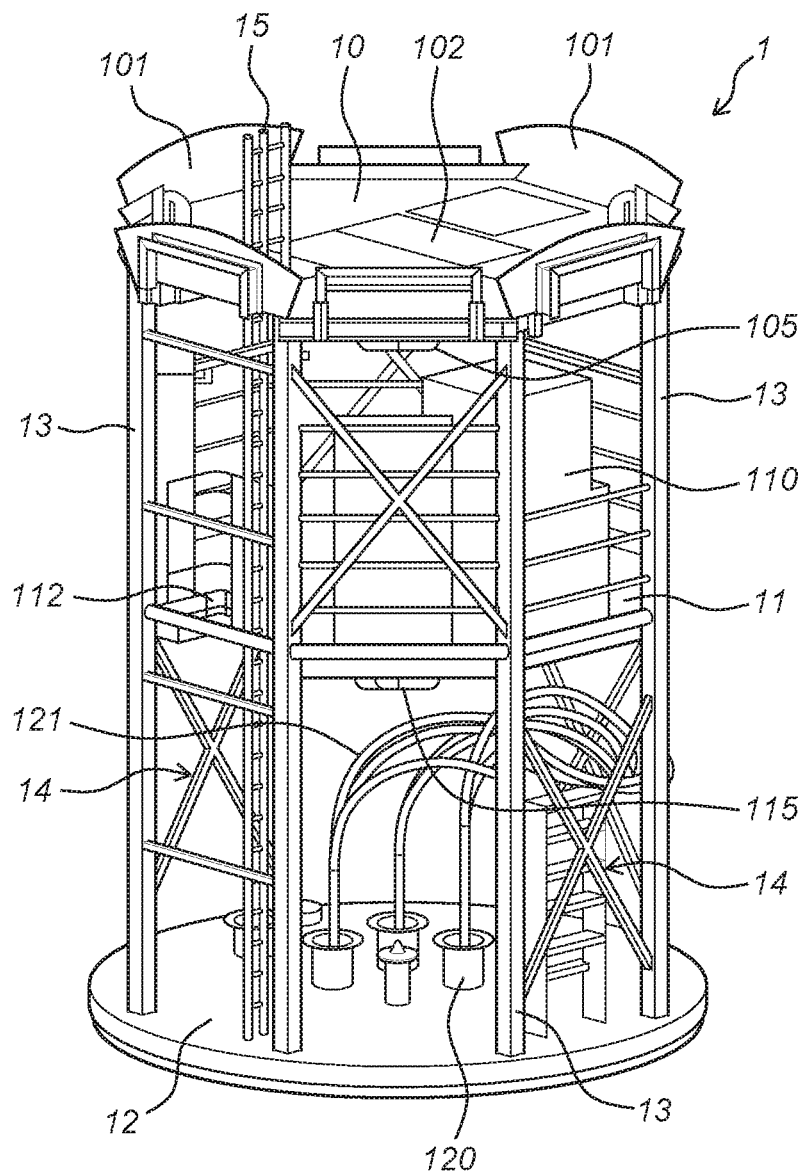
FIG. 2A is a schematic perspective view of a self-supporting support structure for wind turbine equipment according to an embodiment of the invention.

FIG. 2A shows a self-supporting support structure 1 for wind turbine equipment according to a first embodiment of the invention. The shown support structure 1 comprises three floors (10, 11, 12), for instance of sheet steel, placed vertically above each other, which are supported by eight upright steel supports 13. A pair of upright supports 13 can be mutually connected by means of a cross connection 14 in order to give the support structure sufficient torsional stiffness. Upright supports 13 are arranged in accordance with the corner points of an octagon in the peripheral direction of the floors (10, 11, 12). Support structure 1 is self-supporting. This indicates that the support structure 1 provided with wind turbine equipment can be taken up from a support surface by lifting eyes (not shown) using a lifting means, for instance a lifting crane.

Figure 2B:
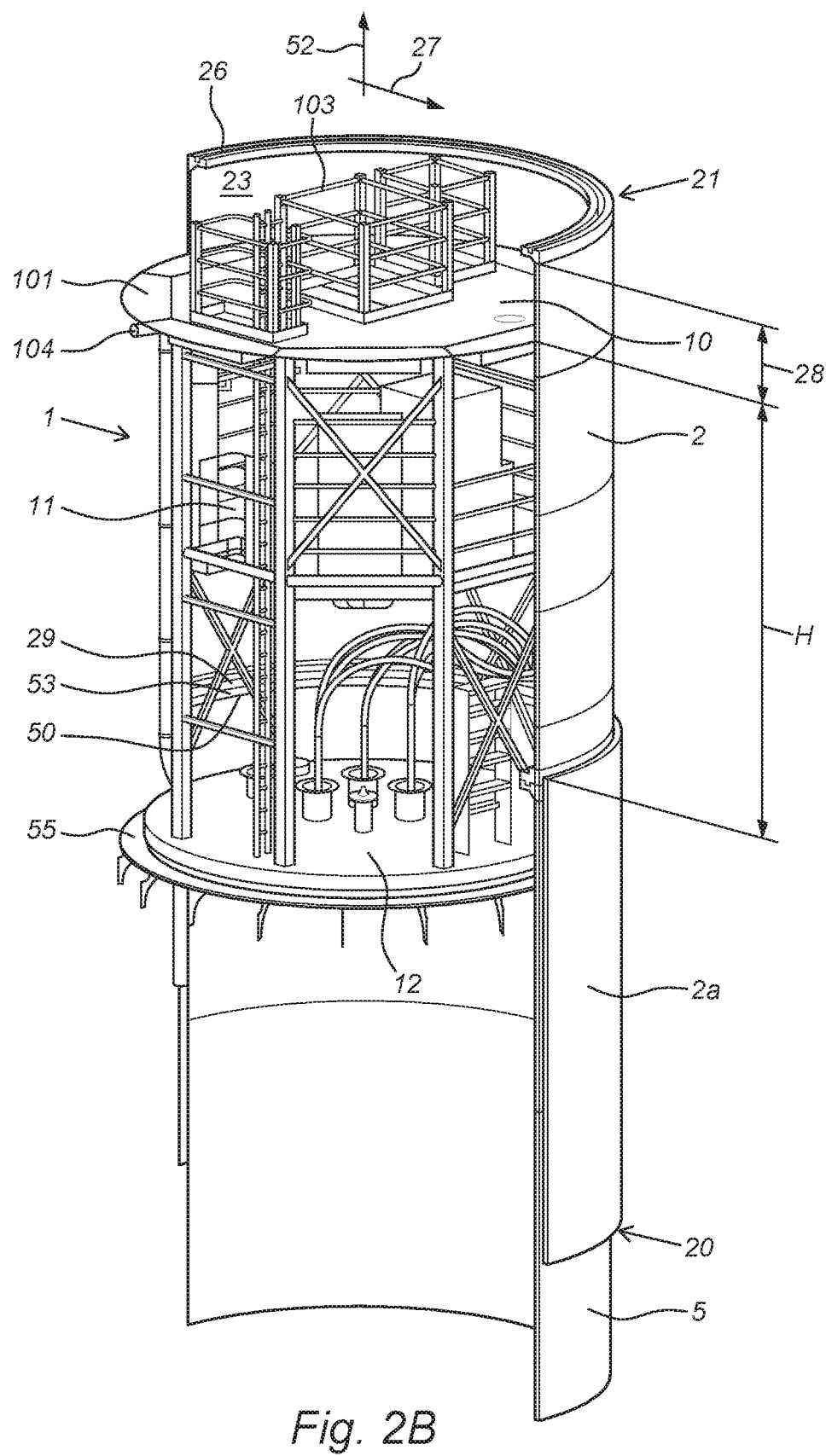
FIG. 2B is a schematic perspective cut-away view of the self-supporting support structure shown in FIG. 2A arranged in a transition piece of a wind turbine.
Figure 7C:
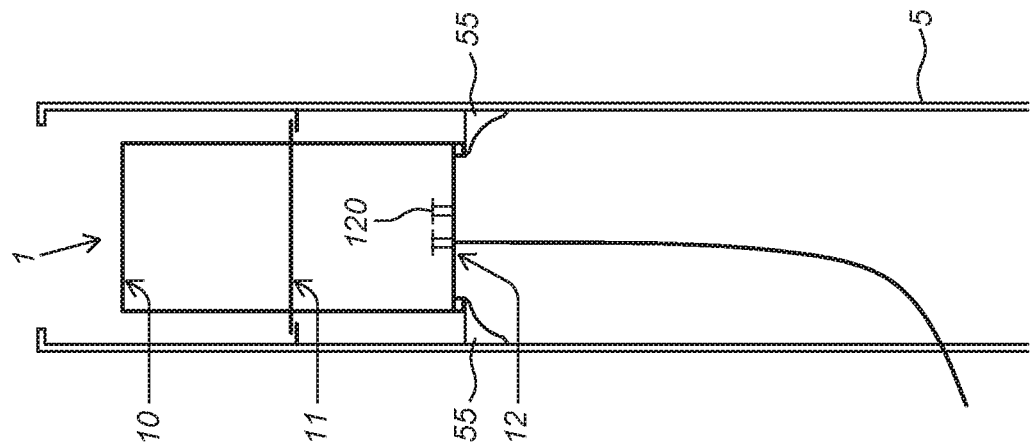
FIGS. 7A, 7B and 7C are schematic cross-sections of a number of ways in which the self-supporting support structure can be connected to a transition piece or monopile.
Figure 7B:
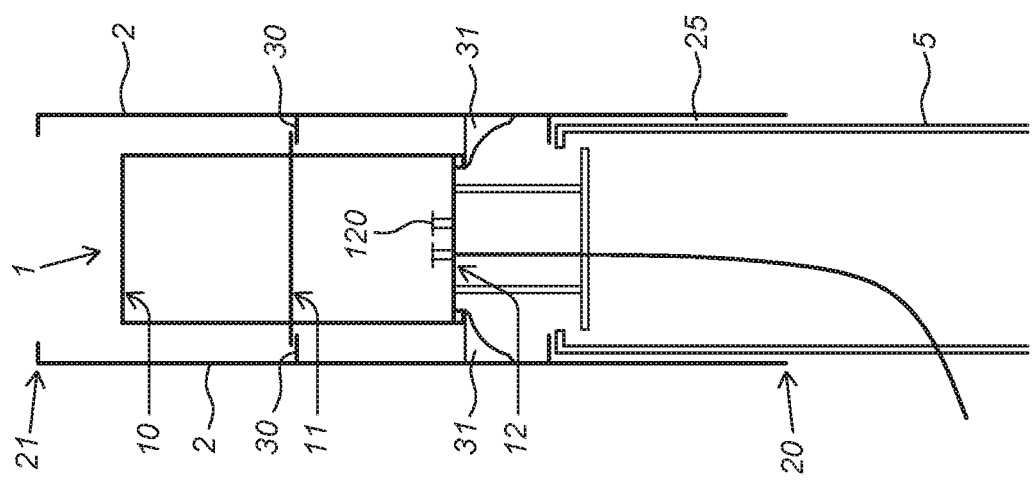
Figure 7A:
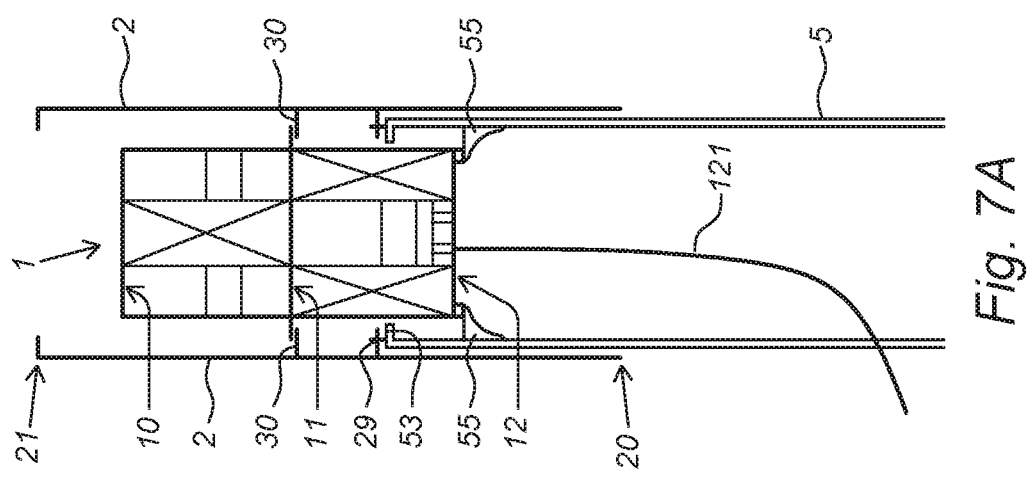

Referring to FIG. 2B, support structure 1 is accommodated in a hollow peripheral body which comprises in the shown embodiment a transition piece 2 for connecting a tower 3 of an offshore wind turbine 4 to a foundation pile, for instance in the form of a monopile 5 arranged in an underwater bottom. If desired, it can also be possible to accommodate support structure 1 in a monopile 5 itself. It is also possible to accommodate support structure 1 in transition piece 2 first, and to then take up the transition piece 2 provided with the support structure 1 using a lifting means. To connect support structure 1 to transition piece 2 an inner wall 23 of transition piece 2 can be provided with a support edge 30 (see also FIGS. 7A, 7B and 7C) which runs in the peripheral direction of transition piece 2 and which a floor (10, 11, 12), preferably floor 11, can support on and can optionally be connected to, for instance by a bolt connection. Support edge 31 forms a stop for a floor (10, 11, 12) provided on the inner wall 23 of the internal cavity of transition piece 2.

In the embodiment shown in FIG. 2B transition piece 2 is connected to monopile 5 by means of a bolt connection. This connection is an alternative to the above described grouted connection. Upright edge 50 of the monopile is provided with a peripheral flange 53 which is connected to an internal peripheral flange 29 of transition piece 2 using bolts.

Upper floor 10 is configured to couple a wind turbine tower 3 to an upper edge 21 of transition piece 2. Upper edge 21 of the transition piece is for this purpose provided with a mounting means in the form of a peripheral flange 26 running in the peripheral direction of transition piece 2 and extending inward over a determined distance in a radial direction 27 of the transition piece. A series of bolt holes is provided in peripheral flange 26. A wind turbine tower 3 to be mounted on transition piece 2 is likewise provided on an underside thereof with a peripheral flange which is aligned with peripheral flange 26 during mounting and is secured thereto using bolts. The upper floor or coupling floor 10 comprises the equipment required for the bolting. The connection of support structure 1 to transition piece 2 and/or to monopile 5 is configured such that coupling floor 10 is situated a height 28 of 0.5-1.5 m (1.6-4.9 ft) below peripheral flange 26.

The upper or coupling floor 10 further is positioned substantially adjacent to an internal peripheral wall 23 of transition piece 2. To enable support structure 1 to be placed in transition piece 2 in adequate manner coupling floor 10 is provided with surface area-reducing means in the form of foldable edge parts 101 of the floor 10. In FIG. 2A edge parts 101 are in folded position, whereby the surface area of the upper floor is reduced relative to the position shown in FIG. 2B, in which edge parts 101 are extended. In the extended position of edge parts 101 the surface area of coupling floor 10 covers substantially the cross-sectional area of transition piece 2 and upper floor 10 has a substantially circular surface area which connects properly to inner wall 23 of transition piece 2. Under these circumstances, there is a continuously uninterrupted gap between an outer edge of the floor 10 and the internal peripheral wall 23 around the entire circumference adjacent to the floor 10. This prevents components from being able to find their way onto underlying floors (11, 12), and increases the operational safety of the wind turbine equipment.

Upper floor 10 is further provided with hatches 102 for pulling through of electrical cables and lifting operations in support structure 1 or transition piece 2. If desired, hatches 102 are fenced off by fencing 103. Coupling floor 10 can also be provided with ventilation pipes 104, which can run through the wall of transition piece 2, and with lighting 105.

A middle floor 11 of support structure 1 is configured to comprise electrical switchgear 110. This switching floor 11 is preferably situated a height of 2.5-3.5 m (8.2-11.5 ft) below upper floor 10.

If desired, switching floor 11 is also provided with hatches 112 for pulling through of electrical cables and lifting operations in support structure 1 or transition piece 2. Switching floor 11 can also be provided with lighting 115, for instance on an underside of floor 11.

Support structure 1 according to the embodiment shown in FIGS. 2A and 2B further comprises a lower floor 12 configured to comprise guide means 120 for electrical cables 121. Electrical cables 121 are guided via guide means 120 to a space below support structure 1, and then continue in (the direction of) monopile 5.

FIG. 2B elucidates how lower floor 12 supports on a second support edge 31 or protrusions incorporated in transition piece 2 (see also FIG. 7B) and running in the peripheral direction of transition piece 2, and on which lower floor 12 can support. It is also possible to provide monopile 5 with a support edge 55 (see also FIGS. 7A and 7C) which runs in the peripheral direction of monopile 5 and on which a lower floor 12 can support.

Figure 6A:
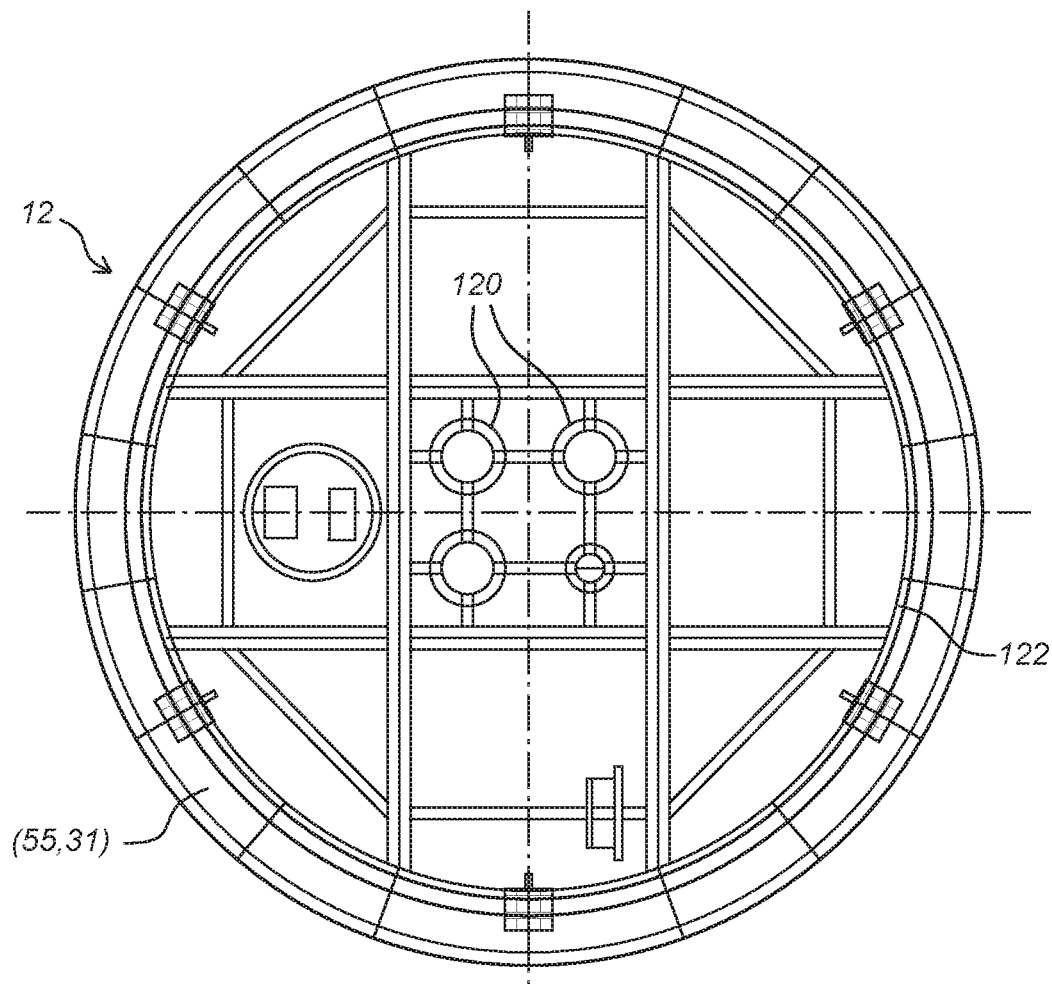
FIGS. 6A, 6B and 6C are schematic top and side views of a lower floor of the self-supporting support structure according to an embodiment of the invention.
Figure 6B:
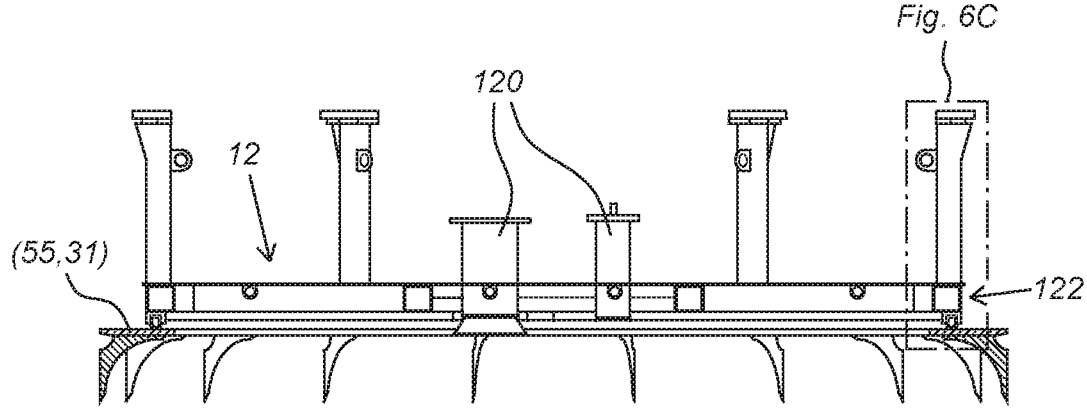
Figure 6C:
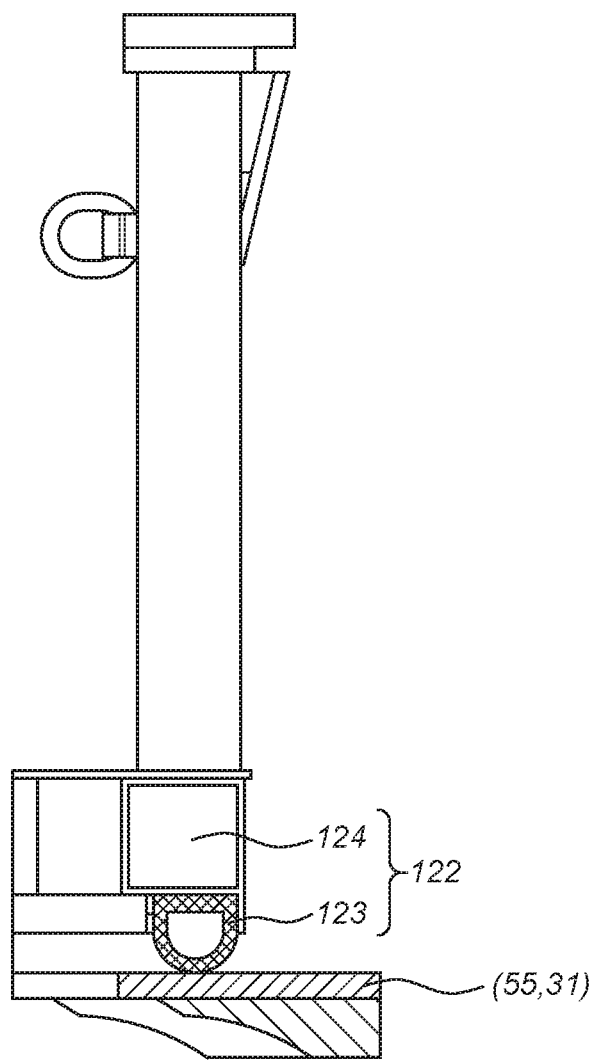

In an embodiment of support structure 1 lower floor 12 is provided along a peripheral edge thereof with sealing means 122 configured to realize a substantially airtight seal with the internal peripheral wall of transition piece 2 or monopile 5, or both. Referring to FIGS. 6A, 6B and 6C, sealing means 122 can comprise a peripheral beam 124, which is provided on an underside with a rubber profile 123 which is hollow and/or inflatable if desired. During mounting, rubber profile 123 is held tightly between peripheral beam 124 of floor 12 and the support ring 55 of a monopile 5 or the support ring 31 of a transition piece 2. Such a substantially airtight seal of a lower inner space of monopile 5 with an inner space of transition piece 2 containing wind turbine equipment prevents corrosion and other inconvenience.

To improve the substantially airtight seal, in an embodiment in which an internal wall of foundation pile 5 is provided with a support edge 55 the lower airtight floor 12 is situated a height below connecting flange 26 of transition piece 2 such that, after coupling of transition piece 2 to foundation pile 5, airtight floor 12 connects to the support edge 55 which functions as a stop for floor 12.

Support structure 1 can further comprise an upright ladder 15 which connects the floors (10, 11, 12) to each other.

The support structure 1 described in FIGS. 2A and 2B is particularly suitable for placing in a transition piece 2 wherein the height difference H between the connection 26 to wind turbine tower 4 (the interface transition piece/tower) and the connection (29, 53) to monopile 5 (the interface transition piece/monopile) amounts to between 6-7 m (19.7-23.0 ft), for instance 6.7 m (22.0 ft). This height difference is dictated by conditions on site, for instance the water depth at the location of installation. This embodiment is preferably applied in relatively shallow water.

Support structure 1 is advantageously applied in a method for assembling an offshore wind turbine 4. An embodiment of the self-supporting support structure 1 is here placed in an internal cavity of a transition piece 2 or of a monopile 5. The transition piece 2 provided with the support structure 1 is placed on monopile 5 with lifting means and connected thereto, for instance by the bolt connection (29, 53) shown in FIGS. 2-4 or by the grouted connection shown in FIG. 1.

Figure 3A:
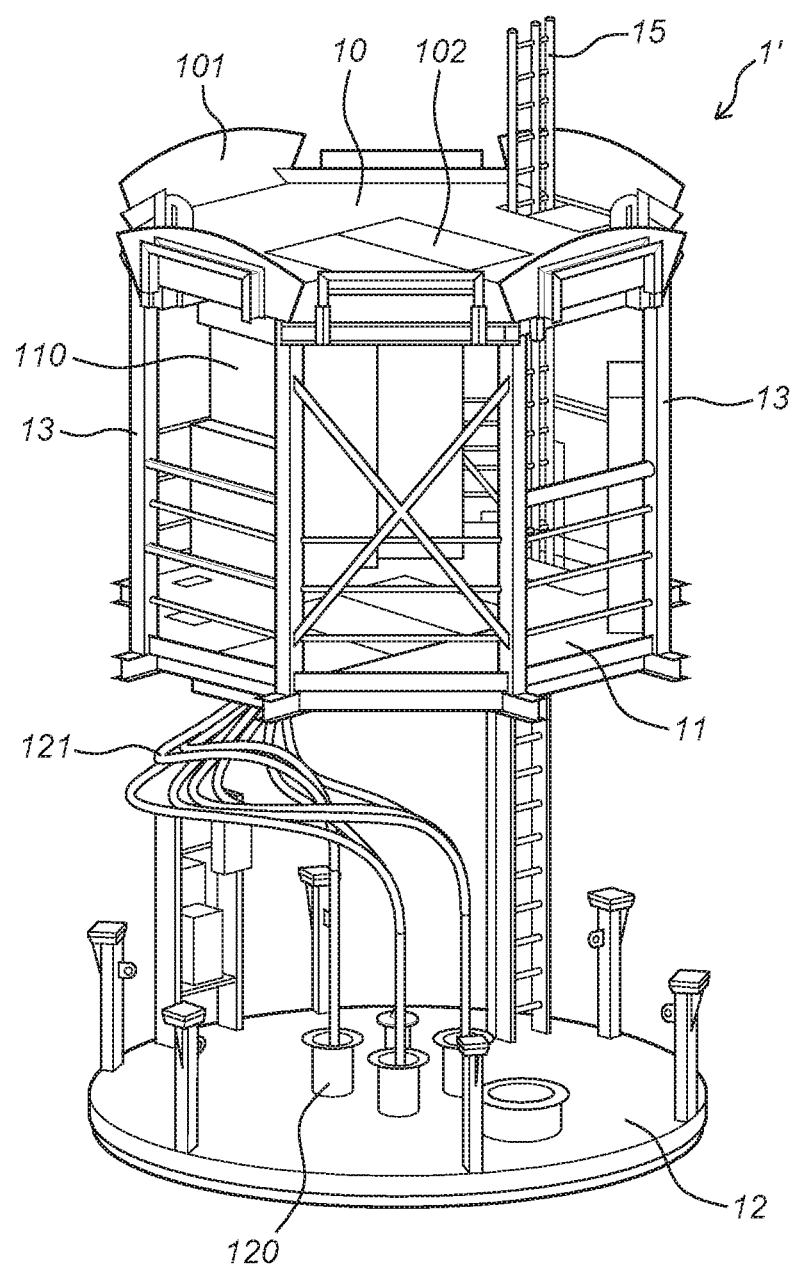
FIG. 3A is a schematic perspective view of a self-supporting support structure for wind turbine equipment according to another embodiment of the invention.
Figure 3B:
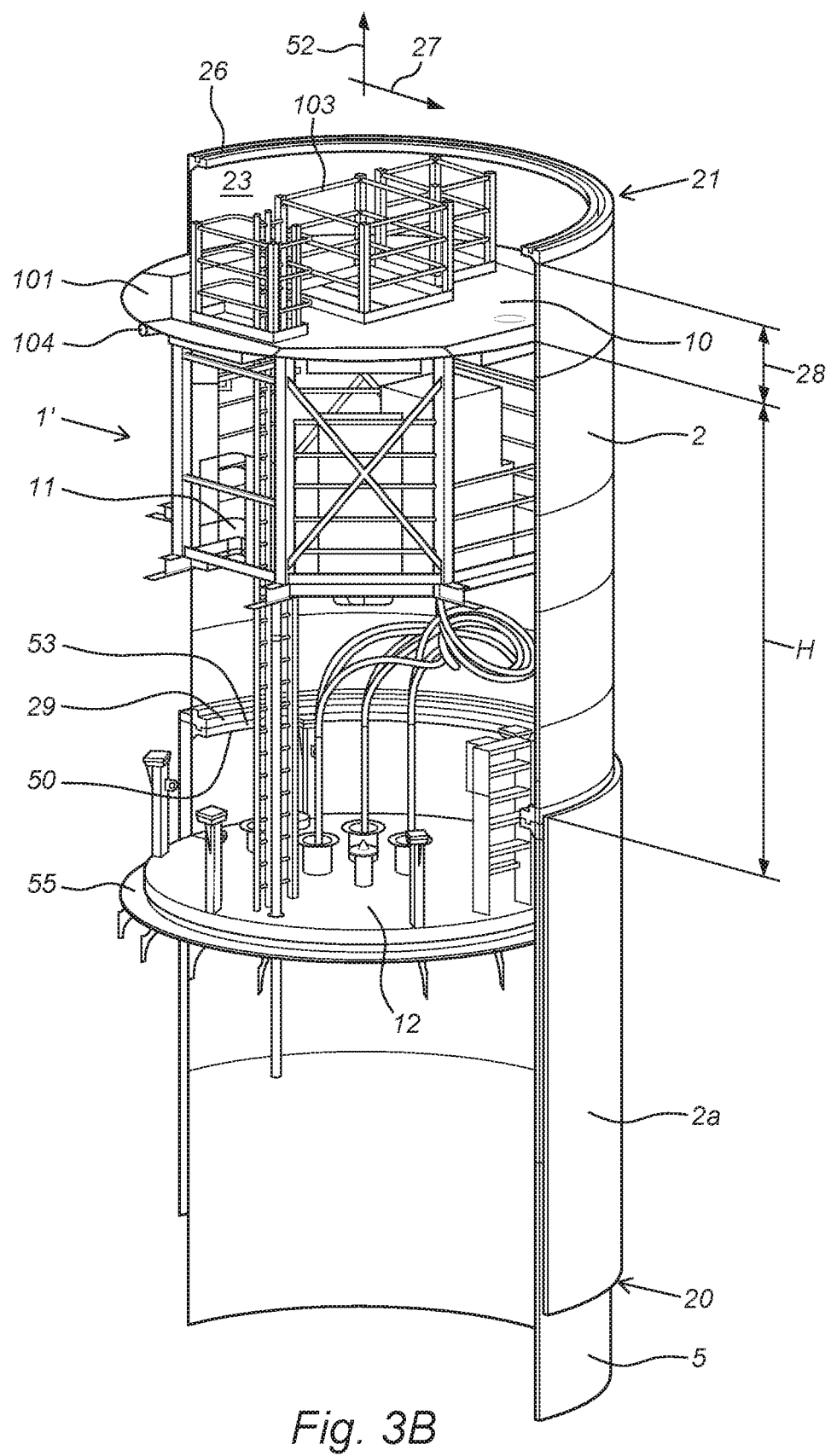
FIG. 3B is a schematic perspective cut-away view of the self-supporting support structure shown in FIG. 3A arranged in a transition piece of a wind turbine.

Shown with reference to FIGS. 3A and 3B is another embodiment of support structure 1'. The same or similar components are designated with the same reference numerals in FIGS. 2-4. The support structure 1' described in FIGS. 3A and 3B is particularly suitable for placing in a transition piece 2 wherein the height difference H between the connection 26 to wind turbine tower 4 and the connection (29, 53) to monopile 5 amounts to between 6.7-8.2 m (22.0-27.0 ft). This height difference is dictated by conditions on site, for instance the water depth. When this embodiment is applied, the water depth is preferably average.

The shown self-supporting support structure 1' comprises two floors (10, 11) which are placed vertically above each other and which are mutually connected by eight upright steel supports 13. A pair of upright supports 13 can be mutually connected by means of a cross connection 14 in order to give the support structure sufficient torsional stiffness. Upright supports 13 are arranged in accordance with the corner points of an octagon in the peripheral direction of the floors (10, 11). Support structure 1' is also self-supporting. In this embodiment a lower floor 12 is provided separately of the two other floors (10, 11) and is also arranged in transition piece 2 or in monopile 5 separately, on the support ring 55 of monopile 5 shown in FIGS. 7A, 7C or the support ring 31 of transition piece 2 shown in FIG. 7B.

Referring to FIG. 3B, support structure 1' is accommodated in a hollow transition piece 2 for connecting a tower 3 of an offshore wind turbine 4 to a monopile 5 arranged in an underwater bottom. If desired, it is also possible to accommodate support structure 1' in a monopile 5 itself as according to the configuration shown in FIG. 7C. Support structure 1' and lower floor 12 are preferably first accommodated in transition piece 2 and then placed on monopile 5. Support structure 1' is connected to transition piece 2 in the same way as in the embodiment shown in FIGS. 2A and 2B, i.e. by means of a support edge 30 (see also FIGS. 7A, 7B and 7C) which runs in the peripheral direction of transition piece 2 and which floor 11 can support on and can optionally be connected to, for instance by a bolt connection. Support edge 31 forms a stop for floor 11 provided on the inner wall 23 of the internal cavity of transition piece 2.

An advantage of the invented support structure 1 is that it has a modular construction and can be employed to assemble a wind turbine tower 4 in different water depths. The modular aspect is manifest in that the floors (10, 11 and 12) preferably have essentially the same construction and function in the different embodiments. In support structure 1' upper floor 10 is thus once again configured to couple a wind turbine tower 3 to an upper edge 21 of transition piece 2 in the same way as elucidated above. A wind turbine tower 3 to be mounted on transition piece 2 is provided on an underside thereof with a peripheral flange which is aligned during mounting with the peripheral flange 26 arranged at the position of the upper edge 21 of transition piece 2 and is secured thereto using bolts. The upper floor or coupling floor 10 comprises the equipment required for the bolting. The connection of support structure 1' to transition piece 2 and/or to monopile 5 is in this embodiment also configured such that coupling floor 10 is situated a height 28 of 0.5-1.5 m (1.6-4.9 ft) below peripheral flange 26.

To enable support structure 1' to be placed in transition piece 2 in adequate manner coupling floor 10 is here also provided with surface area-reducing means in the form of foldable edge parts 101 of floor 10. In FIG. 3A edge parts 101 are in folded position, whereby the surface area of the upper floor is reduced relative to the position shown in FIG. 3B, in which edge parts 101 are extended. In the extended position of edge parts 101 the surface area of coupling floor 10 covers substantially the cross-sectional area of transition piece 2 and upper floor 10 has a substantially circular surface area which connects properly to inner wall 23 of transition piece 2. This prevents components from being able to find their way onto underlying floors (11, 12), and increases the operational safety of the wind turbine equipment.

The upper floor 10 can further be provided with hatches 102, fenced off by fencing 103 if desired, and with ventilation pipes 104 and lighting 105.

In accordance with the other embodiments, a middle floor 11 of support structure 1' is configured to comprise electrical switchgear 110. This switching floor 11 is preferably situated a height of 2.5-3.5 m (8.2-11.5 ft) below upper floor 10. If desired, switching floor 11 is also provided with hatches 112 for pulling through of electrical cables and lifting operations in support structure 1 or transition piece 2. Switching floor 11 can also be provided with lighting 115, for instance on an underside of floor 11.

As already stated above, support structure 1' according to the embodiment shown in FIGS. 3A and 3B does not comprise a lower floor 12. A lower floor 12 is arranged separately in transition piece 2 or monopile 5, and is configured to comprise guide means 120 for electrical cables 121. Electrical cables 121 are guided via guide means 120 to a space below support structure 1', and then continue in (the direction of) monopile 5.

FIG. 3B elucidates how lower floor 12 supports on a second support edge 31 or protrusions incorporated in transition piece 2 (see also FIG. 7B) and running in the peripheral direction of transition piece 2, and on which lower floor 12 can support. It is also possible to provide monopile 5 with a support edge 55 (see also FIGS. 7A and 7C) which runs in the peripheral direction of monopile 5 and on which a lower floor 12 can support.

Referring to FIGS. 6A, 6B and 6C, lower floor 12 is in this embodiment also provided along a peripheral edge thereof with sealing means 122 configured to realize a substantially airtight seal with the internal peripheral wall of transition piece 2 or monopile 5, or both.

Support structure 1' can further comprise an upright ladder 15 which connects the floors (10, 11) of support structure 1' and the separate floor 12 to each other.

Figure 4A:
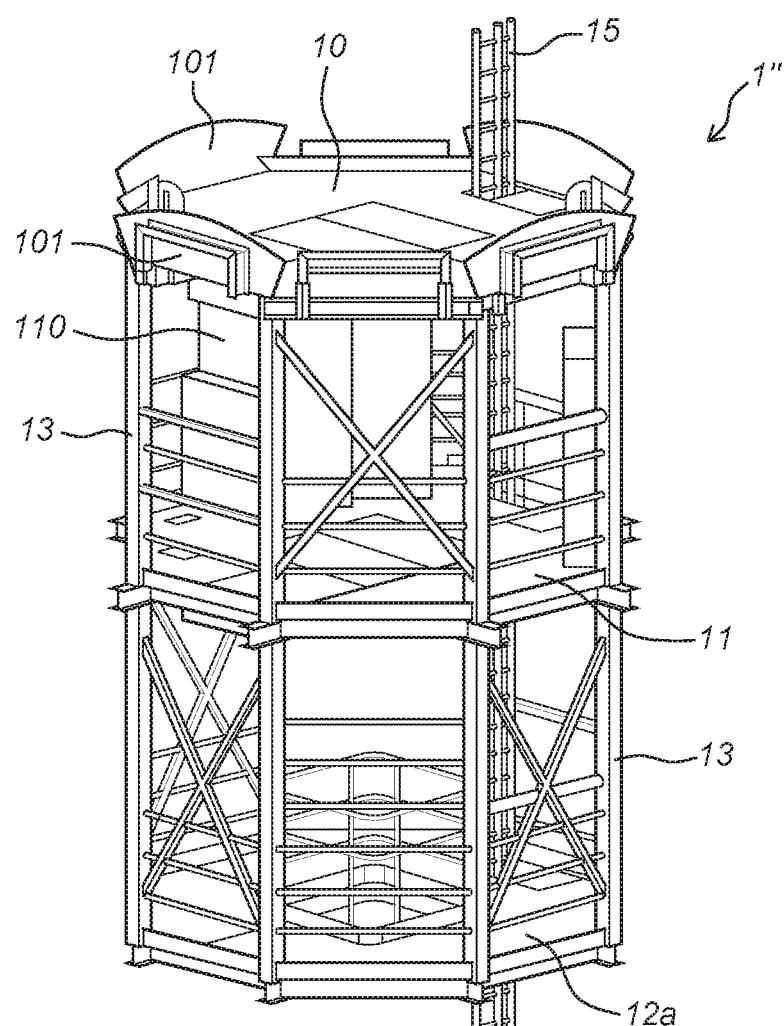
FIG. 4A is a schematic perspective view of a self-supporting support structure for wind turbine equipment according to yet another embodiment of the invention.
Figure 4A:
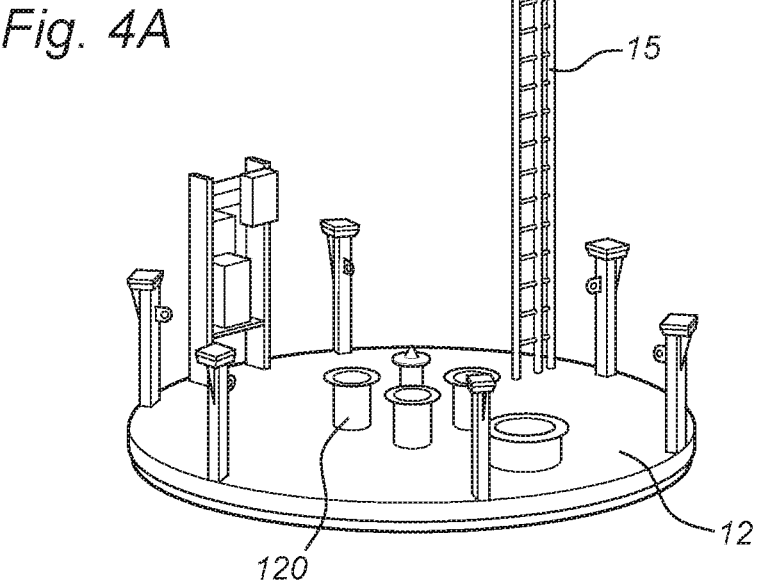
Figure 4B:
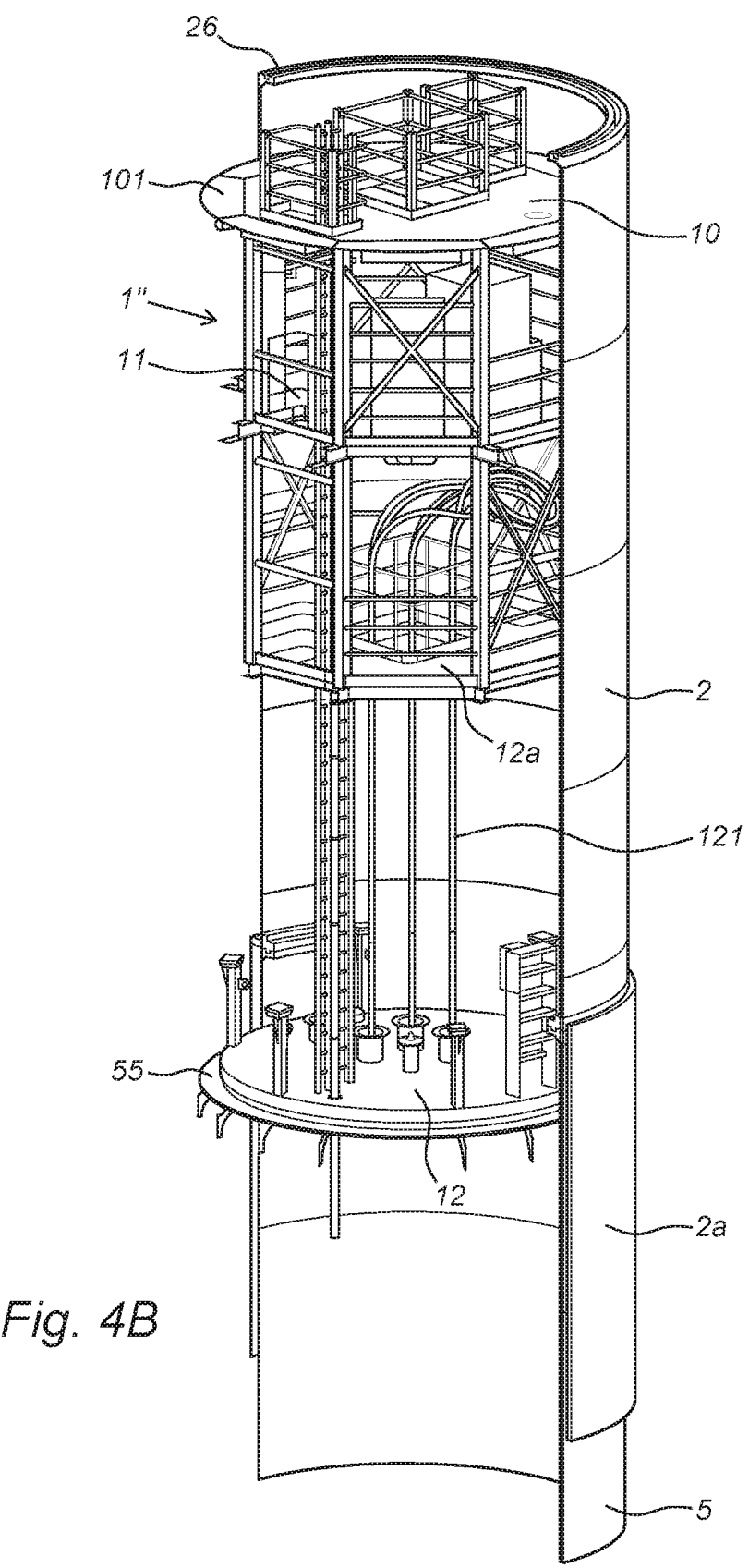
FIG. 4B is a schematic perspective cut-away view of the self-supporting support structure shown in FIG. 4A arranged in a transition piece of a wind turbine.

Shown with reference to FIGS. 4A and 4B is yet another embodiment of the support structure 1". The support structure 1" described in FIGS. 4A and 4B is particularly suitable for placing in a transition piece 2 wherein the height difference H between the connection 26 to wind turbine tower 4 and the connection (29, 53) to monopile 5 amounts to more than 8.2 m. When this embodiment is applied, the water depth is preferably great.

The shown self-supporting support structure 1" comprises three floors (10, 11, 12a) which are placed vertically above each other and which are mutually connected by eight upright steel supports 13. Floor 12a is configured to comprise guide means 120a for electrical cables 121. Electrical cables 121 are guided via guide means 120a to a space below support structure 1", and then continue in the direction of a lower floor 12, which lower floor 12 is arranged separately of support structure 1" in transition piece 2 or monopile 5, on the support ring 55 of monopile 5 shown in FIGS. 7A, 7C or the support ring 31 of transition piece 2 shown in FIG. 7B. Lower floor 12 is also configured to comprise guide means 120 for electrical cables 121. The electrical cables 121 coming from floor 12a are guided via guide means 120 to a space below lower floor 12, and then continue in (the direction of) monopile 5.

Support structure 1" is also self-supporting.

Referring to FIG. 4B, support structure 1" is accommodated in a hollow transition piece 2. If desired, it can also be possible to accommodate this embodiment in a monopile 5 as according to the configuration shown in FIG. 7C. Support structure 1" and lower floor 12 are preferably first accommodated in transition piece 2 and then placed on monopile 5. Support structure 1" is connected to transition piece 2 in the same way as in the embodiments shown in FIGS. 2A, 2B, 3A and 3B, i.e. by means of a support edge 30 (see also FIGS. 7A, 7B and 7C) which runs in the peripheral direction of transition piece 2 and which floor 10, 11 or 12a can support on and can optionally be connected to, for instance by a bolt connection.

In support structure 1" upper floor 10 is once again configured to couple a wind turbine tower 3 to an upper edge 21 of transition piece 2 in the same way as elucidated above. The connection of support structure 1" to transition piece 2 and/or to monopile 5 is in this embodiment also configured such that coupling floor 10 is situated a height 28 of 0.5-1.5 m (1.6-4.9 ft) below peripheral flange 26.

Coupling floor 10 is here also provided with surface area-reducing means in the form of foldable edge parts 101 of floor 10. Upper floor 10 can further be provided with hatches 102, fenced off by fencing 103 if desired, and with ventilation pipes 104 and lighting 105.

In accordance with the other embodiments, a middle floor 11 of support structure 1" is configured to comprise electrical switchgear 110. This switching floor 11 is preferably situated a height of 2.5-3.5 m (8.2-11.5 ft) below upper floor 10. If desired, switching floor 11 is also provided with hatches 112 for pulling through of electrical cables and lifting operations in support structure 1" or transition piece 2. Switching floor 11 can also be provided with lighting 115, for instance on an underside of the floor 11.

In the present embodiment floor 12a is preferably not provided with sealing means configured to realize a substantially airtight seal with the internal peripheral wall of transition piece 2 or monopile 5, or both. This function is preferably fulfilled by the separate lower floor 12, which is provided for this purpose along a peripheral edge thereof with sealing means 122 configured to realize a substantially airtight seal with the internal peripheral wall of transition piece 2 or monopile 5, or both (see also FIGS. 6A, 6B and 6C). Support structure 1" can further comprise an upright ladder 15 which connects the floors (10, 11, 12a) of support structure 1" and the separate floor 12 to each other.

Figure 5:
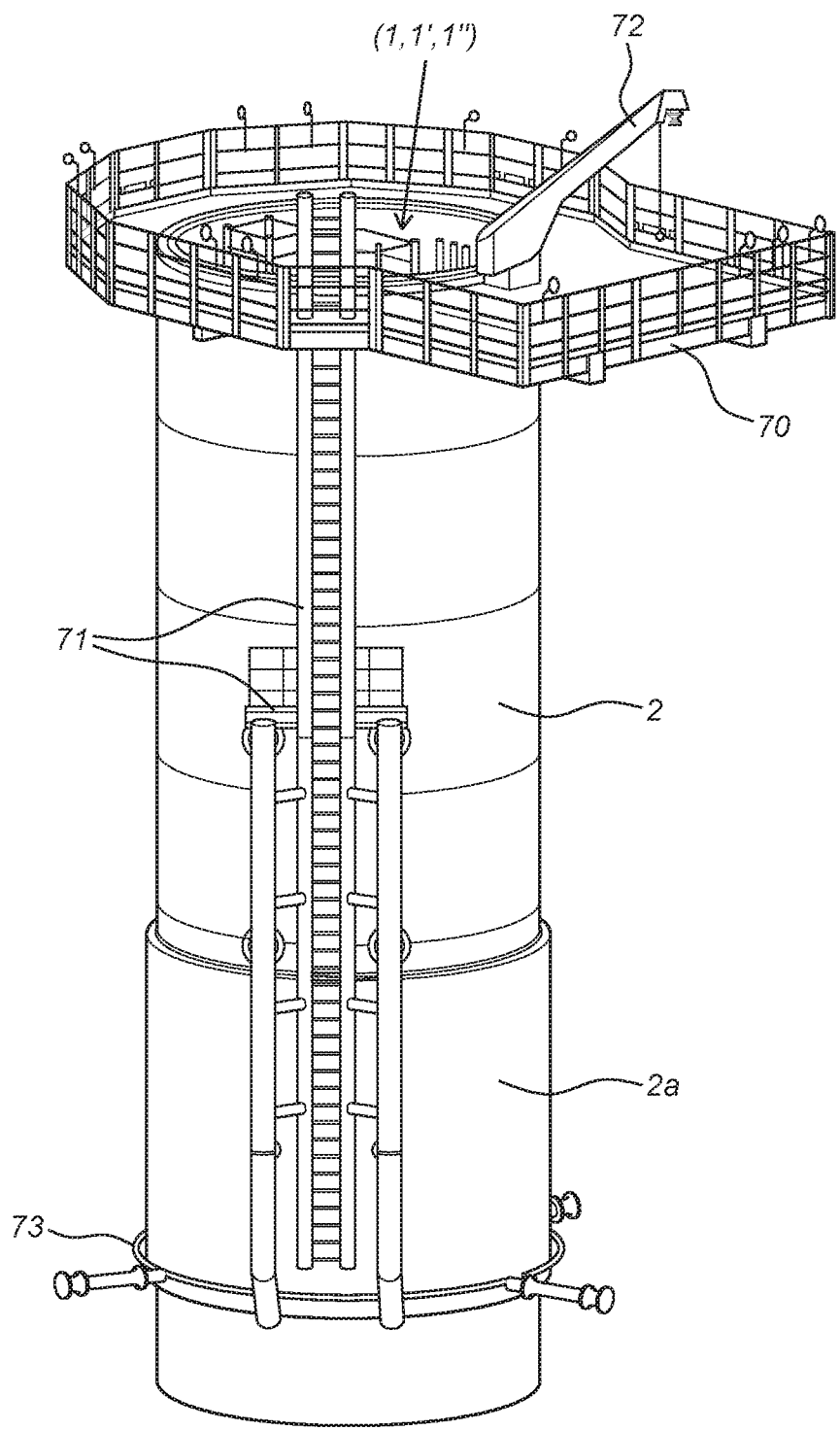
FIG. 5 is a schematic perspective view of a transition piece arranged on a monopile and provided with a self-supporting support structure according to the invention.

Referring to FIG. 5, in addition to an embodiment of the support structure (1, 1', 1") a transition piece 2 according to the invention can if desired also be provided with a work platform 70 which is provided with a boat ladder 71 and a lifting means 72. The transition piece can also be provided with an anti-corrosive construction 73.

Figures 8A, 8B:
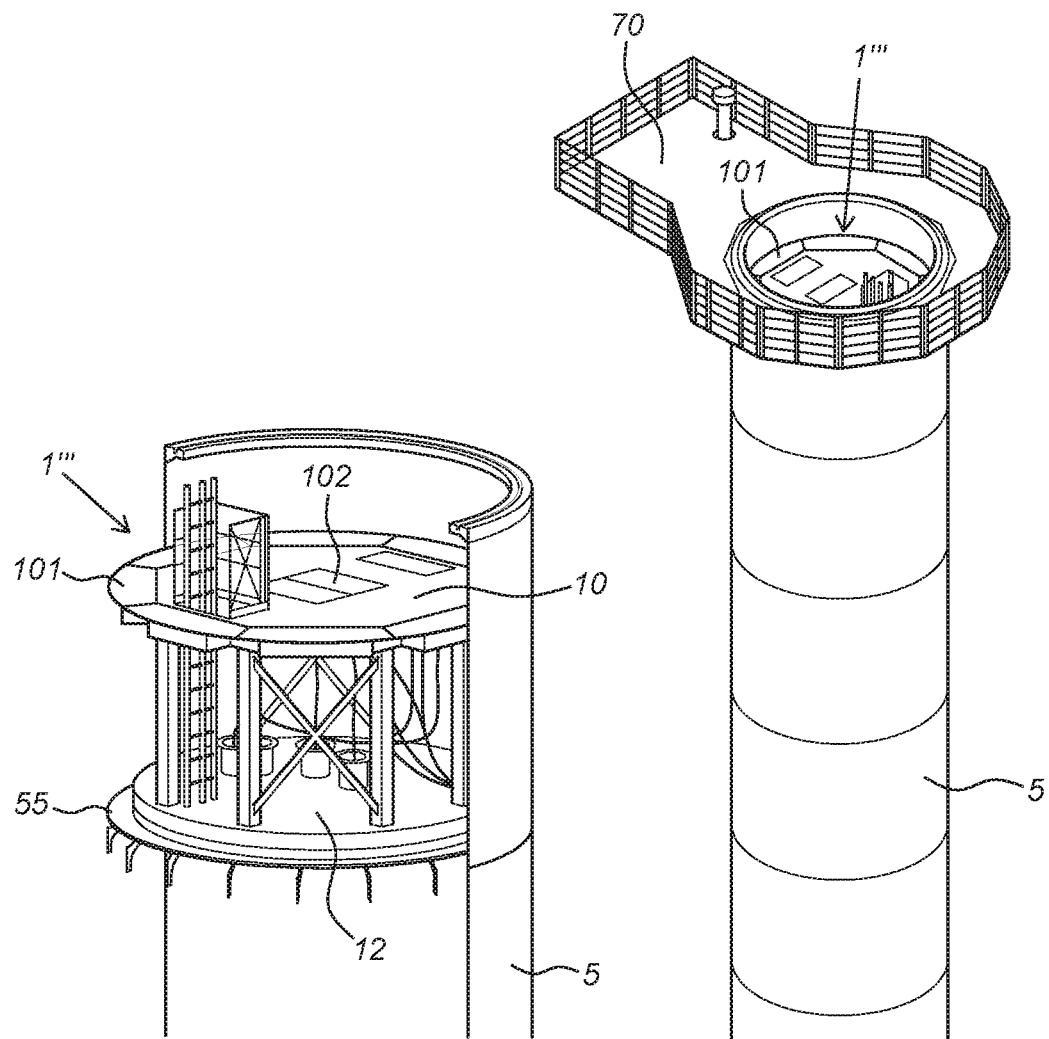
FIG. 8A is a schematic perspective cut-away view of a self-supporting support structure for wind turbine equipment arranged in a foundation pile according to yet another embodiment of the invention.
FIG. 8B is a schematic perspective view of a foundation pile in which the self-supporting support structure shown in FIG. 8A is accommodated.

Referring to FIG. 8B, yet another embodiment of support structure 1''' is accommodated in a hollow monopile 5. If desired, it can also be possible to accommodate this embodiment in a transition piece 2. Support structure 1''' is connected to monopile 5 by having a lower floor 12 of support structure 1''' rest on a support edge 55 present in monopile 5 (see also FIGS. 7A and 7C), and connecting it thereto if desired, for instance by a bolt connection.

In support structure 1''' upper floor 10 is configured to couple a wind turbine tower 3 to an upper edge of monopile 5 in the same way as elucidated above. Coupling floor 10 is also provided with surface area-reducing means in the form of foldable edge parts 101 of floor 10. Upper floor 10 can further be provided with hatches 102, and other components already described above.

In the shown embodiment the support structure has only two floors (10, 12), and at least a part of the electrical switchgear is accommodated elsewhere, for instance in wind turbine 3. Lower floor 12 is provided with sealing means configured to realize a substantially airtight seal with the internal peripheral wall of monopile 5. This function is preferably fulfilled by providing lower floor 12 along a peripheral edge thereof with the sealing means 122 shown in FIGS. 6A, 6B and 6C. Support structure 1''' further comprises an upright ladder 15 which connects the floors (10, 12) of support structure 1''' to each other.

Referring to FIG. 8B, in addition to support structure 1''' monopile 5 can if desired also be provided with a work platform 70.

The invention claimed is:

1. A self-supporting support structure for wind turbine equipment, wherein the support structure is configured to be accommodated in a hollow peripheral body comprising a transition piece for connecting a tower of an offshore wind turbine to a foundation pile, or wherein the support structure is connected directly to the foundation pile, wherein the support structure comprises two or more floors placed vertically above each other and supported by one or more upright supports, at least one floor of the two or more floors is positioned substantially adjacent to an internal peripheral wall of the peripheral body, and said at least one floor is provided with means for reducing a surface area of said at least one floor, wherein there is a continuously uninterrupted gap located between an outer edge of said at least one floor and said internal peripheral wall and wherein said gap extends around an entire circumference adjacent to said at least one floor.

2. The support structure according to claim 1, wherein the means for reducing the surface area comprise foldable edge parts of the floor.

3. The support structure according to claim 1, comprising three or more floors placed vertically above each other and supported by the upright support(s).

4. The support structure according to claim 1, wherein an upper floor is configured to couple said wind turbine tower to an upper side of the peripheral body.

5. The support structure according to claim 1, wherein at least one floor comprises electrical switchgear, and this switching floor is situated a height of at least 2.5 m (8.2 ft) below an upper floor.

6. The support structure according to claim 1, wherein at least one floor comprises guide means for electrical cables.

7. The support structure according to claim 1, wherein at least one floor is provided with a hatch which provides access to an underlying floor.

8. The support structure according to claim 1, wherein a lower floor is provided along a peripheral edge with sealing means configured to realize a substantially airtight seal with the internal peripheral wall of the peripheral body.

9. The support structure according to claim 8, wherein the sealing means comprise a rubber profile.

10. A peripheral body provided with a support structure for wind turbine equipment, wherein the support structure is configured to be accommodated in a hollow said peripheral body comprising a transition piece for connecting a tower of an offshore wind turbine to a foundation pile, or wherein the support structure is connected directly to the foundation pile, wherein the support structure comprises two or more floors placed vertically above each other and supported by one or more upright supports, at least one floor of the two or more floors is positioned substantially adjacent to an internal peripheral wall of the peripheral body, and said at least one floor is provided with means for reducing a surface area of said at least one floor, wherein there is a continuously uninterrupted gap located between an outer edge of said at least one floor and said internal peripheral wall and wherein said gap extends around an entire circumference adjacent to said at least one floor.

11. The peripheral body according to claim 10, comprising said transition piece, wherein the transition piece comprises an internal said hollow peripheral body which is configured to be connected on an underside to the foundation pile and is provided on an upper side with a mounting means or flange for the tower, wherein an internal cavity of the transition piece is provided with the self-supporting support structure.

12. The peripheral body according to claim 11, wherein a lower floor is provided along a peripheral edge with sealing means configured to realize a substantially airtight seal with the internal peripheral wall of a foundation pile, and the lower airtight floor is situated a height below the mounting means such that, after coupling of the peripheral body to the foundation pile, this airtight floor connects to a stop provided on the internal wall of the foundation pile.

13. The peripheral body according to claim 10, wherein an internal cavity of the peripheral body is provided with the self-supporting support structure, and the peripheral body comprises on an upper side thereof a mounting means or flange for the wind turbine tower.

14. The peripheral body according to claim 13, wherein an upper floor of the support structure is configured to couple said wind turbine tower to an upper side of the peripheral body, and this coupling floor is situated a height of 3.9-8.2 ft below the mounting means.

15. The peripheral body according to claim 13, wherein at least one floor supports on a stop provided on the wall of the internal cavity.

16. A method of assembling at least a part of an offshore wind turbine, comprising the steps of providing the self-supporting support structure according to claim 1, and arranging the support structure in an internal cavity of the peripheral body.

17. The method according to claim 16, further comprising of connecting said wind turbine tower to the peripheral body.

* * * * *